Feb. 5, 1952 J. VERREET 2,584,517
CONTINUOUS METHOD FOR THE MANUFACTURE OF
TWISTLESS GLASS FIBER ASSEMBLIES
Filed Jan. 14, 1947 3 Sheets-Sheet 3

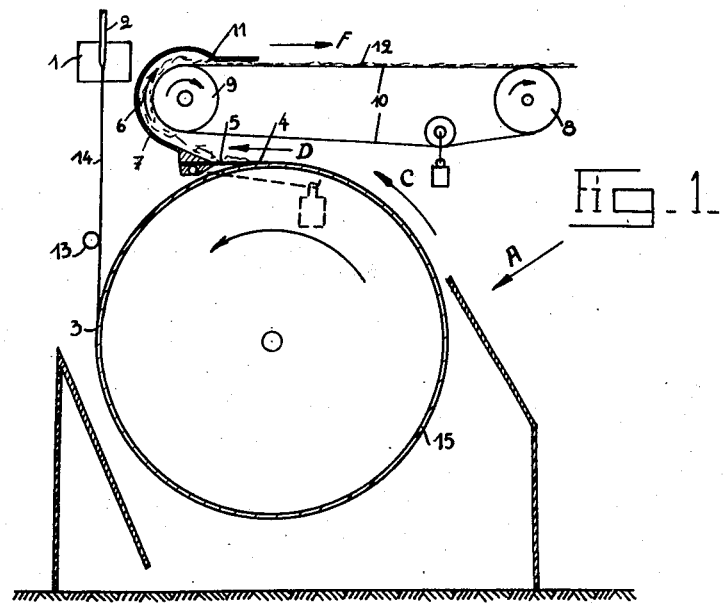
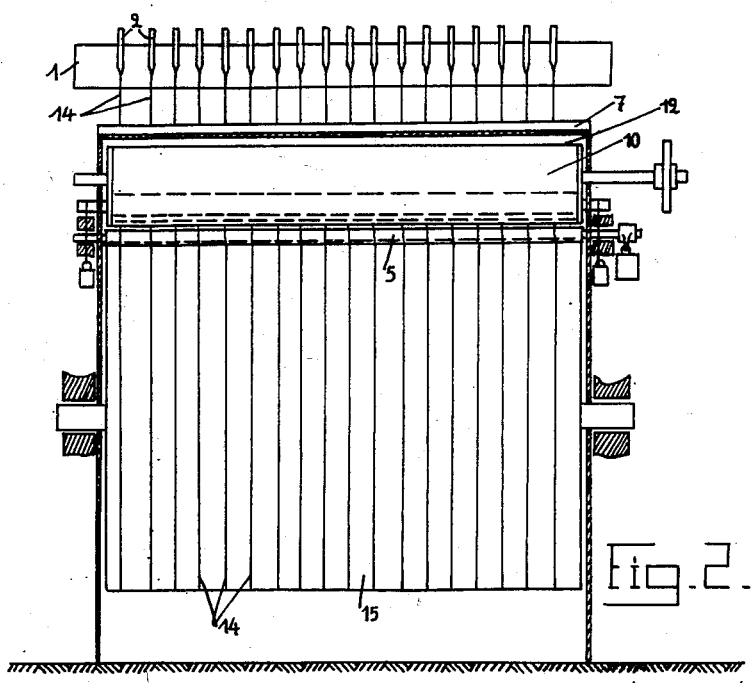

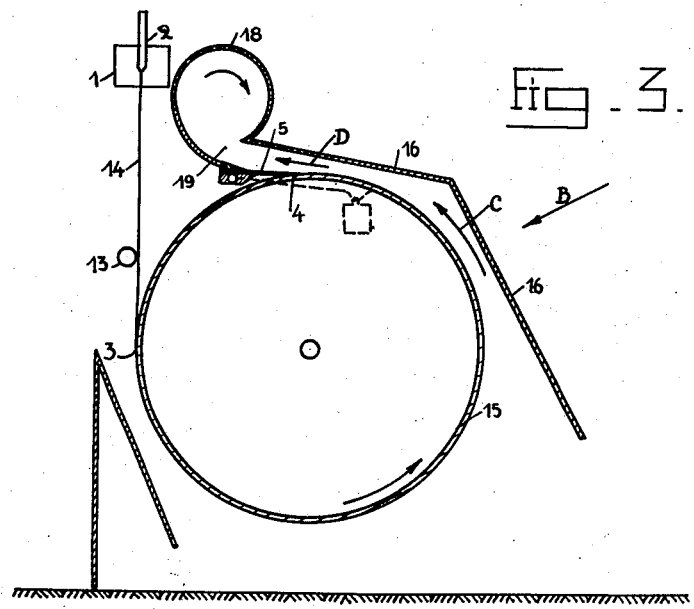
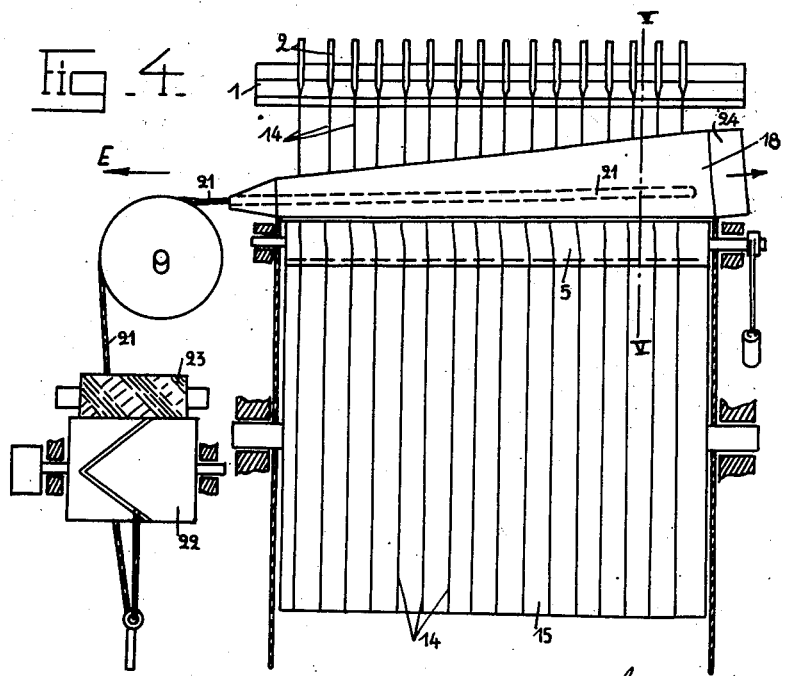

Patented Feb. 5, 1952

2,584,517

UNITED STATES PATENT OFFICE 2,584,517

CONTINUOUS METHOD FOR THE MANUFACTURE OF TWISTLESS GLASS FIBER ASSEMBLIES

Joseph Verreet, Saint-Gilles, Belgium, assignor to Owen Evans, London, England

Application January 14, 1947, Serial No. 722,062
In Belgium January 30, 1946

2 Claims. (Cl. 19—155)

The manufacturing of a ribbon or fleece of fibres (for instance a roving, a fibre mat or a similar product) by means of long and fine glass fibres was up to now effected by the fact that endless glass threads were drawn from glass bars, from glass balls or from a glass bath in fusion by means of a drum and were wound up on this drum. After stopping the machine, the layer formed in this way was cut off and then transformed by different special machines, such as carding engines. This transformation is not only complicated, because it makes necessary a series of operations and different machines, but it has also the inconvenience that the delicate fibre is damaged by the multiple mechanical treatments.

These inconveniences are eliminated by the method according to the present invention, in which the threads are removed from the periphery of the drum by mechanical means before having accomplished a complete turn and in which the wind produced by the rapid rotation of the drum is utilized to carry the produced fibres to a collection place where a ribbon or a fleece of fibres is formed without interruption.

According to the new method, the threads, the fibres and the ribbon or fleece fibres are obtained in one single operation; the manufacturing is consequently considerably simplified. Furthermore, the mechanical transformation of the glass fibres which can easily lead to deteriorations, is replaced by a pneumatic one. To that effect, no special source of compressed air is necessary. According to the invention, it is rather the drum wind which is utilized as an advantageous means of transport. Up to now, this drum wind was only a cause of trouble and deteriorations because it disturbed the spinning operation at the place where the wires were drawn off and caused the rupture of the fine glass threads. This injurious drum-wind which must be carefully kept away from the place where the threads were drawn off and wound up, is now utilized to produce a useful work because it is employed not only for the transportation of the threads removed from the drawing-off drum, but also to align them and to form a ribbon or fleece of fibres at a collection place. It has consequently several functions to fulfill.

The drum wind is guided in a laminar flow as regularly as possible so as to avoid any deterioration of the fibres by rebounding or intermingling. The wind guiding channels are constructed so as to avoid steps, corners, dead angles, etc.

In connection with this, it is also necessary to effect the mechanical removal of the threads from the drum as carefully as possible. According to the invention, this removal is effected without any essential modification of the direction of the displacement of the threads, i. e. about tangentially.

The particulars of the invention are described hereafter in connection with the drawings showing two embodiments.

Figure 1 is a cross section of a machine for the continuous manufacturing of a fibre mat.

Figure 2 is a view of this machine in the direction of the arrow A of Figure 1.

Figure 3 is a cross section of a machine for the manufacture of a roving.

Figure 4 is a view of this machine in the direction of the arrow B of Figure 3.

Figure 5:
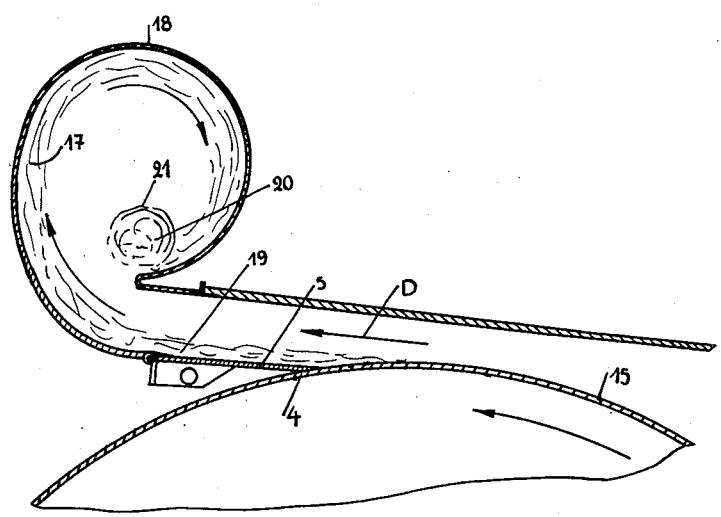
Figure 5 is a section on the line V—V of Figure 4.

In the machine according to Figures 1 and 2 the threads 14 drawn at 1 from the glass bar 2 by the drawing-off drum 15 are wound up at 3 on this drum and carried along as far as the place 4. Here, they are removed from the periphery of the drum by suitable mechanical means, advantageously constituted by a knife 5, which press constantly on the drum. As this knife forms a very acute angle with the tangent to the drum at the point of contact, this removal is approximately tangential. Sufficient momentum is imparted to the filaments by the rapidly rotating drum 15 to mechanically break the filaments against knife 5 and guide plate 7. The fibres obtained in this way are conducted by the drum wind—as indicated by arrows C and D—in an approximately tangential direction, into the semi-annular channel 6 which is constituted by a guide-plate 7 contiguous to the knife 5 and by an endless travelling band 10 which passes over pulleys 8 and 9. The fibres conveyed in the channel 6 are then deposited on the travelling band 10 at the collection place 11 where the channel 6 becomes smaller. In this way, a mat 12 is produced without interruption on the band 10 travelling at slow speed, which mat may then be transformed or wound up at will.

In order that the threads may be removed with certitude at 4 by the knife 5, the drum has a smooth surface, usefully ground. A bar 13 impregnated with a humectant along which the threads glide in passing, is provided to insure a sufficient adherence of the threads on the smooth drum.

In the second embodiment of a machine according to the invention represented in Figures 3 to 5 and serving to manufacture a roving, the different parts which will be found back in Figures 1 and 2 have been marked with the same reference characters. Pieces 16, constituting walls, have been disposed so as to form a wind channel. The drum wind guided in this way (arrows C, D) carries along the fibres 17 removed from the drum at 4 and conducts them to a collector 18 of a helicoidal section, which presents an aperture 19 for the entry of the wind, which extends over the whole length of the drum. A twistless assembly of relatively short glass fibres is formed along the curved surface of the interior of the conical form 18. Within the thickness of this glass fibre assembly streamline flow of the wind along the curved surface of the conical form 18 is maintained. Practically all of the fires are substantially aligned in the direction of streamline flow. The collection place for the fibres 17 is constituted in this case by a whirlpool 20 which establishes itself parallel to the axis of the drum 15 and which has for effect to form a tubular fleece of fibres 21. This latter is withdrawn in a permanent way from the reservoir 18 in form of a fibre ribbon by mechanical traction in the longitudinal direction E, for instance, by means of a driven cylinder 22 and is wound up on a bobbin 23. The collector, preferably of conical form, is open at one extremity 24. The wind aligns the fibres in the embodiment of Figures 1 and 2, because at the collection place 11, it is guided parallel to the drawing-off direction F of the fibre mat 12.

As illustrated by the drawing, the aerodynamical conduction of the wind mentioned hereinbefore according to the invention is realized in the two embodiments from the places 4 where the threads are taken off to the collection places 11 or 20.

What I claim is:

1. A continuous method for the manufacture of a twistless assembly of relatively short glass fibres in strand form comprising continuously drawing a plurality of spaced glass filaments between a smooth rapidly rotating drawing off drum and bars provided adjacent thereto, winding and conveying said glass filaments on the periphery of said smooth drawing off drum to a position on the periphery located just before the filaments have completely encircled the drum, guiding and removing with mechanical removing means said glass filaments in a tangential direction relative to the drum periphery at a point before the filaments have accomplished a complete turn in contact with the drum periphery, the drum rotating at a sufficient speed to provide a wind of sufficient velocity to maintain the alignment of the glass fibers in the direction of those filaments leaving the drum, breaking the glass filaments into glass fibers from the action of the rotating drum imparting momentum to the filaments to mechanically break the filaments against said mechanical removing means and a conical form defining a curved path downstream of the glass filament removal position, guiding, in streamline flow within the thickness of the glass fiber assembly formed along the curved surface on the interior of the conical form, the wind produced by the rotation of the drum immediately adjacent a curved path downstream of the glass filaments removal position, whereby the filaments, broken into relatively short fibres from the rapid rotation of the drum, and the wind, are carried into the streamline flow of the wind adjacent the curved path to prevent excessive intermingling of the short glass fibres obtained and to form a twistless assembly of glass fibers along the curved path of streamline flow immediately adjacent the conical form, and continuously removing the so-formed twistless glass assembly in a direction parallel to the streamline flow of the wind.

2. A continuous method for the manufacture of a twistless assembly of relatively short glass fibres in strand form comprising continuously drawing a plurality of spaced glass filaments between a smooth rapidly rotating drawing off drum and bars provided adjacent thereto, winding and conveying said glass filaments on the periphery of said smooth drawing off drum to a position on the periphery located just before the filaments have completely encircled the drum, guiding and removing with mechanical removing means said glass filaments in a tangential direction relative to the drum periphery at a point before the filaments have accomplished a complete turn in contact with the drum periphery, the drum rotating at a sufficient speed to provide a wind of sufficient velocity to maintain the alignment of the glass fibers in the direction of those filaments leaving the drum, breaking the glass filaments into glass fibers from the action of the rotating drum imparting momentum to the filaments to mechanically break the filaments against said mechanical removing means drum immediately adjacent a vortex path downstream of the glass filament removal position, guiding, in streamline flow within the thickness of the glass fiber assembly formed along the curved surface on the interior of the conical form, the wind produced by the rotation of the drum immediately adjacent a vortex path downstream of the glass filaments removal position, whereby the filaments, broken into relatively short fibres from the rapid rotation of the drum, and the wind, are carried into the streamline flow of the wind adjacent the curved path to prevent excessive intermingling of the short glass fibres obtained and to form a twistless assembly of glass fibers along the curved path of streamline flow immediately adjacent the conical form, and continuously removing the so-formed twistless glass assembly in a direction parallel to the streamline flow of the wind.

JOSEPH VERREET.

REFERENCES CITED

The following references are of record in the file of this patent:

UNITED STATES PATENTS

| Number | Name | Date |
|---|---|---|
| 1,923,183 | Blum | Aug. 22, 1933 |
| 2,313,256 | Morgan | Mar. 9, 1943 |
| 2,313,630 | Dockerty | Mar. 9, 1943 |
| 2,369,481 | Modigliani | Feb. 13, 1945 |